(12) United States Patent
Matsuoka (10) Patent No.: US 10,844,593 B1
(45) Date of Patent: Nov. 24, 2020

(54) EXTENDABLE ARM, VARIABLE SHAPE FRAME, AND VARIABLE SHAPE THREE-DIMENSIONAL STRUCTURE

(71) Applicant: FUJIMIYASEISAKUSHO CO., LTD., Kumamoto (JP)

(72) Inventor: Norimichi Matsuoka, Kumamoto (JP)

(73) Assignee: FUJIMIY ASEISAKUSHO CO., LTD., Kumamoto (JP)

( * ) Notice: Subject to any disclaimer, the term of this patent is extended or adjusted under 35 U.S.C. 154(b) by 0 days.

(21) Appl. No.: 16/692,140

(22) Filed: Nov. 22, 2019

(30) Foreign Application Priority Data

Jun. 7, 2019 (JP) .................. 2019-107021

(51) Int. Cl.
| | |
|---|---|
| *E04B 1/34* | (2006.01) |
| *E04H 15/50* | (2006.01) |
| *E04C 3/00* | (2006.01) |
| *E04B 1/344* | (2006.01) |
| *E04B 1/32* | (2006.01) |
| *E04B 1/19* | (2006.01) |
| *G09F 15/00* | (2006.01) |

(52) U.S. Cl.
CPC ............ *E04B 1/3441* (2013.01); *E04C 3/005* (2013.01); *E04H 15/50* (2013.01); *E04B 1/19* (2013.01); *E04B 2001/3294* (2013.01); *G09F 15/0062* (2013.01); *G09F 15/0068* (2013.01)

(58) Field of Classification Search
CPC ........ E04B 1/343; E04B 1/344; E04B 1/3441; E04H 1/1244; E04H 9/16; E04H 12/187; E04H 15/44; E04H 15/48; E04H 15/50; E04H 17/18; E04F 10/0629; E04F 10/10; E04C 3/005; E06B 9/0661; E06B 9/0669; E06B 9/0638; E06B 9/0676; G09F 15/0062; G09F 15/0068

See application file for complete search history.

(56) References Cited

U.S. PATENT DOCUMENTS

| | | | | | |
|---|---|---|---|---|---|
| 4,885,891 | A | * | 12/1989 | Lynch ..................... | E04H 15/50 52/646 |
| 5,125,205 | A | * | 6/1992 | Wichman .................. | A47F 5/13 40/610 |
| 9,482,027 | B2 | * | 11/2016 | Mallookis ............... | E04H 15/50 |
| 9,840,837 | B1 | * | 12/2017 | Matsuoka ............... | E04H 15/50 |
| 10,280,645 | B1 | * | 5/2019 | Yang ....................... | E04H 15/18 |
| 2003/0074845 | A1 | * | 4/2003 | Sample ................... | E04H 15/42 52/63 |

(Continued)

FOREIGN PATENT DOCUMENTS

| | | | |
|---|---|---|---|
| JP | 2014159070 A | | 9/2014 |
| KR | 20090008417 U | * | 8/2009 |
| WO | WO-2008006022 A2 | * | 1/2008 ............ E04H 15/50 |

*Primary Examiner* — Ryan D Kwiecinski
(74) *Attorney, Agent, or Firm* — Hauptman Ham, LLP (57) ABSTRACT

An extendable arm is comprised of a plurality of cross units arranged in one direction with adjacent ones of the cross units being pivotally coupled at their ends via end coupling shafts. Each of the cross units is comprised of first and second rigid members crossing each other in an X shape and pivotally coupled at their intersection via a middle coupling shaft. The extendable arm includes an engaging protrusion and an engaging recess which move toward each other as the extendable arm extends and fit together when the extendable arm extends to a predetermined length.

10 Claims, 6 Drawing Sheets

(56) References Cited

U.S. PATENT DOCUMENTS

| | | | | |
|---|---|---|---|---|
| 2015/0300560 | A1* | 10/2015 | Matsuoka | A63H 33/00 |
| | | | | 362/427 |
| 2016/0319985 | A1* | 11/2016 | Matsuoka | E04B 1/3441 |
| 2018/0051458 | A1* | 2/2018 | Matsuoka | F16S 3/08 |
| 2018/0155922 | A1* | 6/2018 | Matsuoka | E04C 3/02 |
| 2019/0316343 | A1* | 10/2019 | Matsuoka | A63H 33/00 |

* cited by examiner

EXTENDABLE ARM, VARIABLE SHAPE FRAME, AND VARIABLE SHAPE THREE-DIMENSIONAL STRUCTURE

BACKGROUND OF THE INVENTION

Field of the Invention

The present invention relates to extendable arms that can extend and collapse, and more particularly to an extendable arm comprised of a plurality of X-shaped cross units arranged in one direction and pivotally coupled to each other. The present invention also relates to variable shape frames and variable shape three-dimensional structures using the extendable arms.

Background Art

The applicant of the present application proposed in Japanese Unexamined Patent Application Publication No. 2014-159070 an extendable arm that extends and collapses in a linear or curved fashion. This extendable arm is comprised of a plurality of cross units arranged linearly, and each cross unit is comprised of two rigid members crossing each other in an X-shape.

RELATED ART DOCUMENTS

Patent Documents

[Patent Document 1] Japanese Unexamined Patent Publication No. 2014-159070

SUMMARY OF INVENTION

Extendable arms, when in a collapsed state, are convenient to carry and store due to their compactness. However, when used for partitions, furniture, building structures, etc., the extendable arms are extended to serve as partition walls of a large space. A variable shape frame or a variable shape three-dimensional structure can also be produced by using a plurality of extendable arms.

In such applications, extendable arms need to have higher rigidity when in an extended state.

It is an object of the present invention to provide an extendable arm having higher rigidity when in the extended state, a variable shape frame, and a variable shape three-dimensional structure.

An extendable arm according to the present invention is comprised of a plurality of cross units arranged in one direction with adjacent ones of the cross units being pivotally coupled at their ends via end coupling shafts, each of the cross units being comprised of first and second rigid members crossing each other in an X shape and pivotally coupled at their intersection via a middle coupling shaft. The extendable arm includes an engaging protrusion and an engaging recess which move toward each other as the extendable arm extends and fit together when the extendable arm extends to a predetermined length.

In one embodiment of the extendable arm, the cross units include a first cross unit and a second cross unit which are located adjacent to each other, the engaging protrusion is provided on one end of the first rigid member of the first cross unit, and the engaging recess is provided on the other end of the first rigid member of the second cross unit.

In another embodiment of the extendable arm, the engaging protrusion is provided on the first rigid member, and the engaging recess is provided on the second rigid member. In this embodiment, for example, the engaging protrusion is provided on one end of the first rigid member, and the engaging recess is provided on one end of the second rigid member.

A variable shape frame according to the present invention includes: the extendable arm of any of the above with its starting and terminal ends pivotally coupled via the end coupling shafts.

In one embodiment of the variable shape frame, the extendable arm includes first and second linear arms that are disposed parallel to each other and extend and collapse in a linear fashion, and first and second semicircular arms that extend and collapse in a curved fashion and have opposing 180-degree semicircular shapes when in an extended state. The variable shape frame is a track-shaped frame formed by arranging the first linear arm, the first semicircular arm, the second linear arm, and the second semicircular arm in this order and pivotally coupling adjacent ones of these arms.

A variable shape three-dimensional structure according to the present invention includes: a plurality of the variable shape frames of any of the above which are arranged at an interval in a vertical direction and connected via a longitudinal coupling member.

An embodiment of the variable shape three-dimensional structure further includes: an enclosing member that encloses the variable shape three-dimensional structure along its outer or inner periphery without gaps.

According to the extendable arm of the present invention, when the extendable arm is in the extended state, the engaging protrusion and the engaging recess fit together, so that the two members located close to each other are fixedly positioned with respect to each other. The extendable arm thus has increased rigidity when in the extended state. The variable shape frame and the variable shape three-dimensional structure using such an extendable arm stably maintain their shape when in the extended state.

DESCRIPTION OF EMBODIMENTS

Embodiments of an extendable arm, a variable shape frame, and a variable shape three-dimensional structure according to the present invention will be described with reference to the drawings. Elements having the same or similar functions are denoted with the same reference characters throughout the figures.

Figure 1:
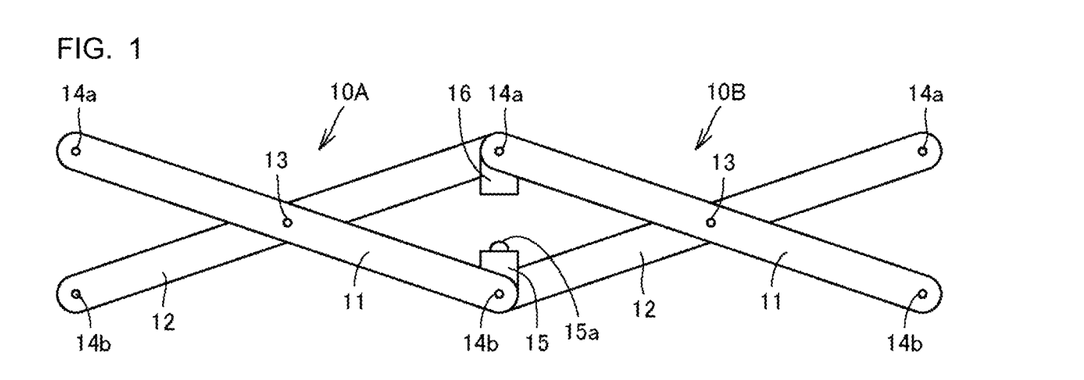
FIG. 1 is a front view of an extendable arm according to an embodiment of the present invention.
Figure 2:
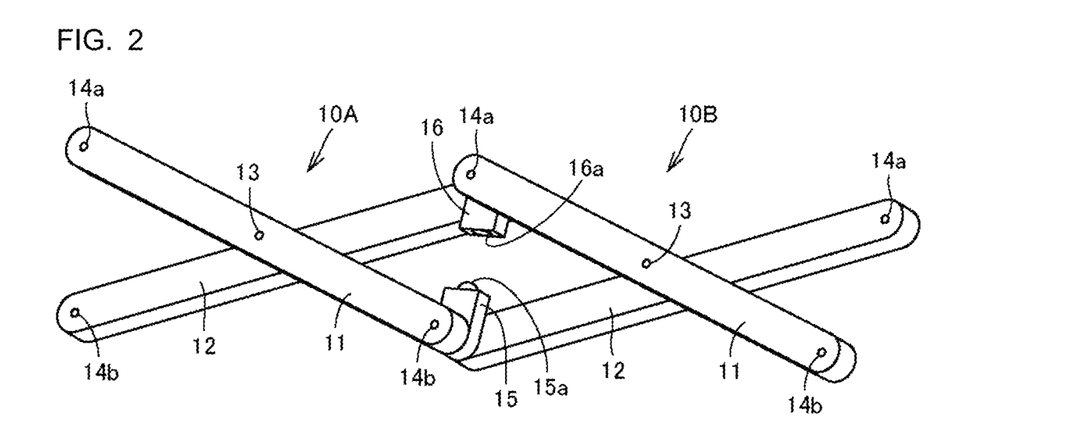
FIG. 2 is a perspective view of the extendable arm of FIG. 1 as viewed from below.

Embodiment of FIGS. 1 and 2

An extendable arm is comprised of a plurality of cross units coupled in a linear or curved fashion and can extend and collapse in the longitudinal direction of the extendable arm. FIGS. 1 and 2 show two cross units 10A, 10B coupled together.

Each cross unit 10A, 10B is comprised of a first rigid member 11 and a second rigid member 12 which cross each other in an X-shape and are pivotally coupled at their intersection via a middle coupling shaft 13. An extendable arm is comprised of a plurality of cross units 10A, 10B arranged in one direction with adjacent ones of the cross units 10A, 10B being pivotally coupled at their ends via upper and lower end coupling shafts 14a, 14b. Although two cross units 10A, 10B are coupled in the illustrated example, any number of cross units 10A, 10B may be coupled together.

In the embodiment shown in FIGS. 1 and 2, each rigid member 11, 12 extends linearly. The extendable arm using such linear rigid members 11, 12 extends and collapses in a linear fashion.

Although not shown in the figures, in another embodiment, each rigid member 11, 12 may be curved in, e.g., its lateral direction, and the end coupling shafts 14a, 14b at both ends of each rigid member 11, 12 may be located at positions offset to one side in the lateral direction from a longitudinal central axis passing through the middle coupling shafts 13 of the rigid members 11, 12. An extendable arm using such curved rigid members extends and collapses in a curved fashion.

In the embodiment shown in FIGS. 1 and 2, the extendable arm includes an engaging protrusion 15a and an engaging recess 16a which fit together, in order to have higher rigidity when in the extended state. Specifically, the extendable arm has a projecting member 15 having a hemispherical engaging protrusion 15a and an opposing projecting member 16 having a spherical engaging recess 16a. The projecting member 15 is fixed to one end (the portion where the end coupling shaft 14b is provided) of the first rigid member 11 of the first cross unit 10A, and the opposing projecting member 16 is fixed to the other end (the portion where the end coupling shaft 14a is provided) of the first rigid member 11 of the second cross unit 10B.

The engaging protrusion 15a and the engaging recess 16a are located so as to face each other. The engaging protrusion 15a and the engaging recess 16a move toward each other as the extendable arm extends, and move away from each other as the extendable arm collapses. When the extendable arm extends to a predetermined length, the engaging protrusion 15a fits in the engaging recess 16a so that the extendable arm is not allowed to extend anymore. Since the engaging protrusion 15a and the engaging recess 16a fit together, one end of the first cross unit 10A is firmly coupled to the other end of the second cross unit 10B. That is, since the engaging protrusion 15a and the engaging recess 16a fit together, extension of the extendable arm in its longitudinal direction (the horizontal direction in FIG. 1) is reliably stopped and displacement of the rigid members 11, 12 of the extendable arm in its thickness direction (the direction perpendicular to the plane of paper of FIG. 1) is reliably restrained.

In an extendable arm in which adjacent ones of cross units are pivotally coupled via the end coupling shafts 14a, 14b, looseness and displacement between the members near the end coupling shafts 14a, 14b tend to occur. In the embodiment shown in FIG. 1, the engaging protrusion 15a and the engaging recess 16a fit together near the end coupling shafts 14a, 14b. This effectively restrains looseness and displacement between the members near the end coupling shafts 14a, 14b.

The engaging protrusion 15a and the engaging recess 16a may have any shape as long as the engaging protrusion 15a and the engaging recess 16a fit together.

Although not shown in FIG. 1, the projecting member 15 having an engaging protrusion 15a may be provided on one end of the first rigid member 11 of the second cross unit 10B, and the opposing projecting member 16 having an engaging recess 16a may be provided on the other end of a first rigid member of a third cross unit, not shown.

In still another embodiment, the projecting member 15 may be provided on one end of the first rigid member 11 of the first cross unit 10A and the projecting member 16 may be provided on one end of the second rigid member 12 of the first cross unit 10A. Similarly, the projecting member 15 may be provided on one end of the first rigid member 11 of the second cross unit 10B and the projecting member 16 may be provided on one end of the second rigid member 12 of the second cross unit 10B.

There may be a case where the engaging protrusion 15a and the engaging recess 16a do not exactly fit together due to a manufacturing dimensional deviation and clearance between members. Accordingly, for example, a slit, a cutout, etc. may be formed around the engaging recess 16a, or the engaging protrusion 15a may be elastically supported such that the engaging protrusion 15a can move vertically.

Figure 3:
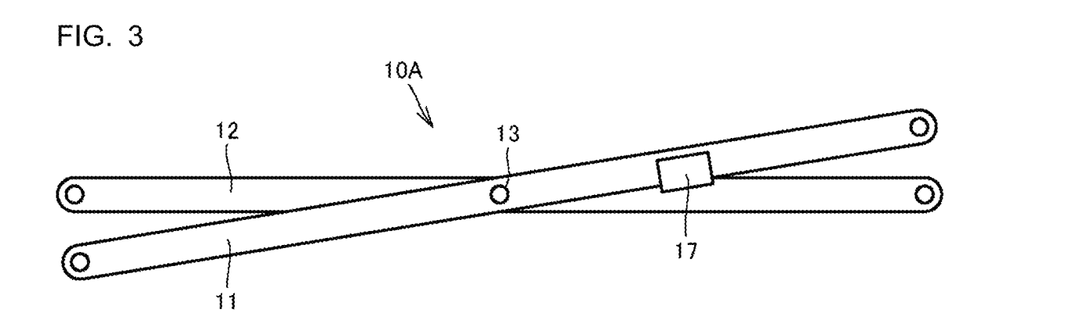
FIG. 3 is a front view of a cross unit of an extendable arm according to another embodiment of the present invention.
Figure 4:
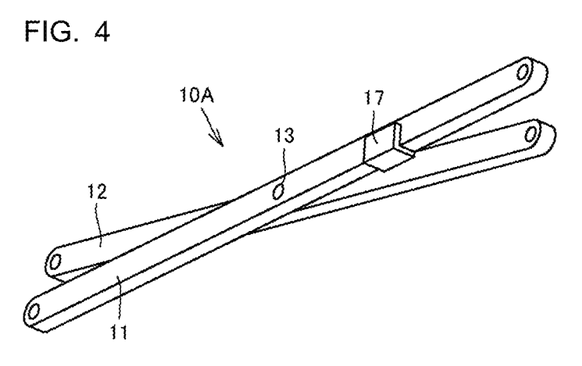
FIG. 4 is a perspective view of the cross unit of FIG. 3 as viewed from below.

Embodiment of FIGS. 3 and 4

An embodiment shown in FIGS. 3 and 4 is different from the embodiment shown in FIGS. 1 and 2 in that the forms and positions of the engaging protrusion and the engaging recess which fit together. As shown in FIGS. 3 and 4, the second rigid member 12 has an L-shaped member 17 on its side surface. The first rigid member 11 fits in the L-shaped member 17 when an extendable arm extends to a predetermined length.

With the first rigid member 11 fitted in the L-shaped member 17, the upper surface of the bottom wall of the L-shaped member 17 is in surface contact with the lower end face of the first rigid member 11 and the inner surface of the standing wall of the L-shaped member 17 is in surface contact with the outer side surface of the first rigid member 11. As the first rigid member 11 fits in the L-shaped member 17, extension of the extendable arm in its longitudinal direction (the horizontal direction in FIG. 3) is reliably stopped and displacement of the rigid members 11, 12 of the extendable arm in its thickness direction (the direction perpendicular to the plane of paper of FIG. 3) is reliably restrained.

In the embodiment shown in FIGS. 3 and 4, the L-shaped member 17 functions as an engaging recess, and the thickness portion of the first rigid member 11 which fits in the L-shaped member 17 functions as an engaging protrusion.

Figure 5:
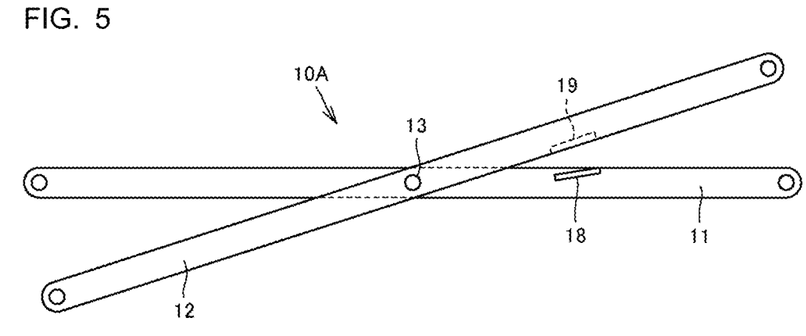
FIG. 5 is a front view of a cross unit of an extendable arm according to still another embodiment of the present invention.
Figure 6:
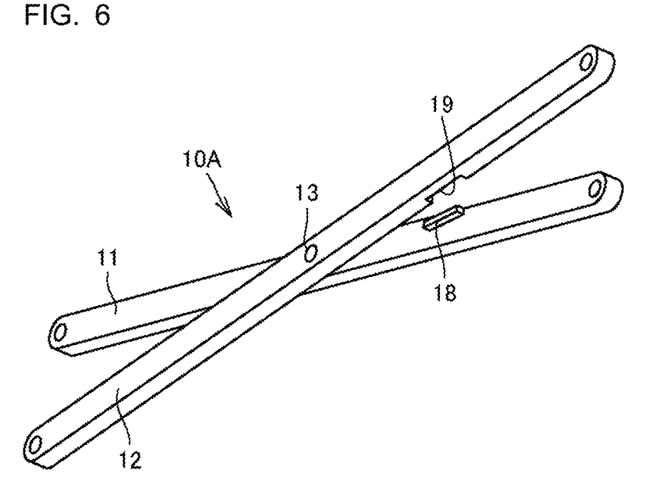
FIG. 6 is a perspective view of the cross unit of FIG. 5 as viewed from below.

Embodiment of FIGS. 5 and 6

In an embodiment shown in FIGS. 5 and 6, the first rigid member 11 has a ridge 18 on its side surface, and the second rigid member 12 has a corresponding groove 19 in the lower edge of its side surface facing the side surface of the first rigid member 11. The ridge 18 extends in a direction tilted with respect to the longitudinal axis of the first rigid member 11. When an extendable arm extends to a predetermined length, the ridge 18 of the first rigid member 11 fits in the groove 19 of the second rigid member 12, thereby increasing rigidity of the extendable arm in the extended state.

In the embodiment shown in FIGS. 5 and 6, the ridge 18 functions as an engaging protrusion, and the groove 19 functions as an engaging recess.

Figure 7:
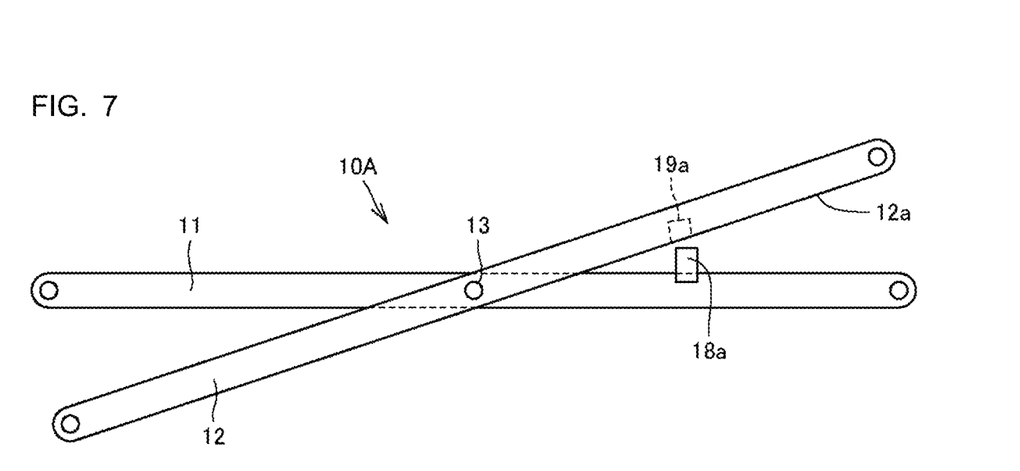
FIG. 7 is a front view of a cross unit of an extendable arm according to yet another embodiment of the present invention.
Figure 8:
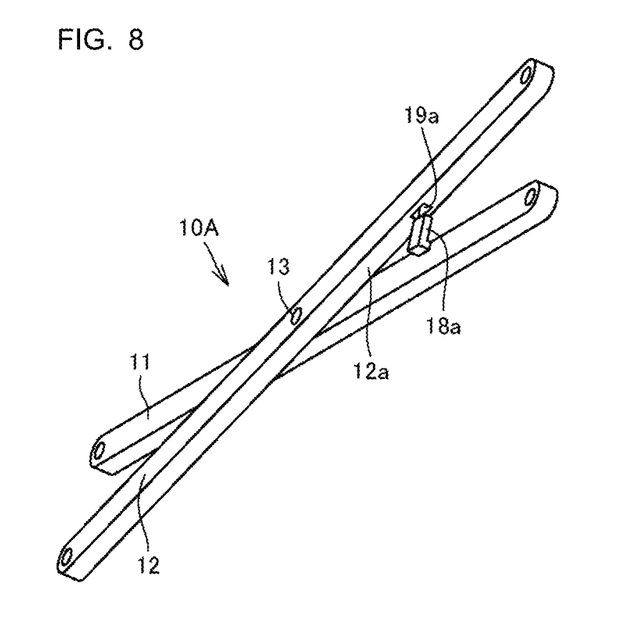
FIG. 8 is a perspective view of the cross unit of FIG. 7 as viewed from below.

Embodiment of FIGS. 7 and 8

In an embodiment shown in FIGS. 7 and 8, the first rigid member 11 has an L-shaped engaging protrusion 18a on its side surface, and the second rigid member 12 has in its bottom surface (lateral end face) 12a an engaging recess 19a in which the engaging protrusion 18a fits. According to this embodiment, as the engaging protrusion 18a and the engaging recess 19a fit together, extension of an extendable arm in its longitudinal direction (the horizontal direction in FIG. 7) is reliably stopped, and displacement of the rigid members 11, 12 of the extendable arm in its thickness direction (the direction perpendicular to the plane of paper of FIG. 7) is reliably restrained.

Figure 9:
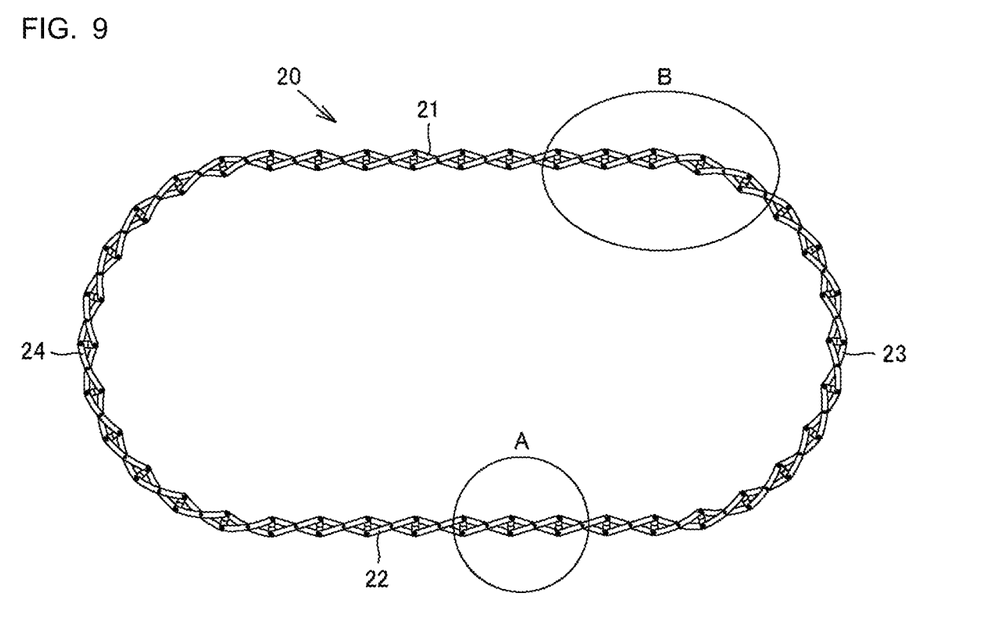
FIG. 9 is a front view of a variable shape frame according to an embodiment of the present invention.
Figure 10:
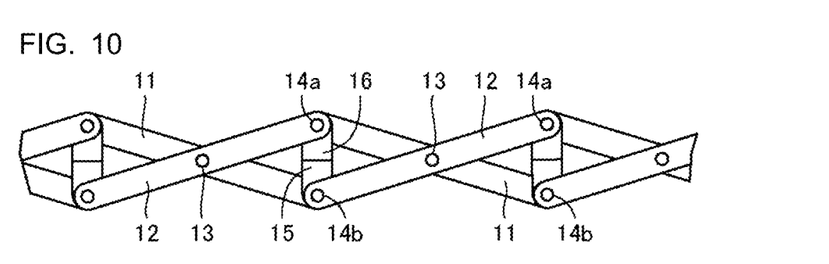
FIG. 10 is an enlarged view of a portion A in FIG. 9.
Figure 11:
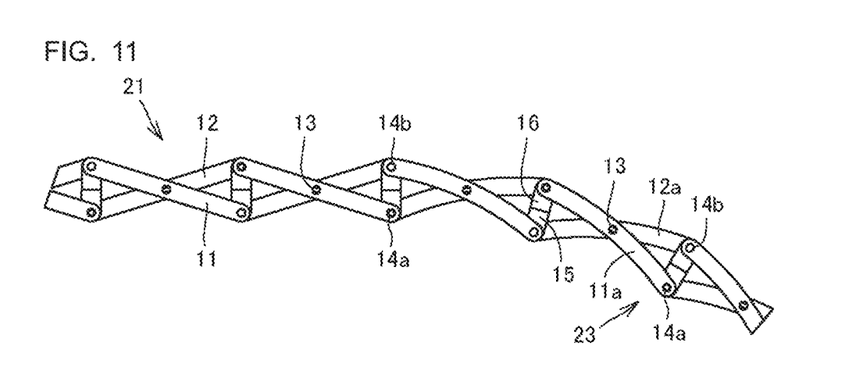
FIG. 11 is an enlarged view of a portion B in FIG. 9.

Embodiment of FIGS. 9 to 11

FIGS. 9 to 11 are front views of a variable shape frame according to an embodiment of the present invention. A variable shape frame 20 is formed by coupling a plurality of cross units linearly to form an extendable arm and pivotally coupling the starting and terminal ends of the extendable arm via end coupling shafts. The shape of the frame becomes larger as the extendable arm extends, and becomes smaller as the extendable arm collapses.

In the illustrated embodiment, the extendable arm that forms the variable shape frame 20 includes first and second linear arms 21, 22 and first and second semicircular arms 23, 24. The first and second linear arms 21, 22 are disposed parallel to each other and extend and collapse in a linear fashion. The first and second semicircular arms 23, 24 extend and collapse in a curved fashion and have opposing 180-degree semicircular shapes when in the extended state. The variable shape frame 20 is a track-shaped frame formed by arranging the first linear arm 21, the first semicircular arm 23, the second linear arm 22, and the second semicircular arm 24 in this order and pivotally coupling adjacent ones of these arms.

A line connecting the end coupling shafts 14a, 14b located at one ends of the linear arms 21, 22 is perpendicular to the longitudinal axes of the linear arms 21, 22. Similarly, a line connecting the end coupling shafts 14a, 14b located at the other ends of the linear arms 21, 22 is perpendicular to the longitudinal axes of the linear arms 21, 22. Since each semicircular arm 23, 24 has a 180-degree semicircular shape, a line connecting the end coupling shafts 14a, 14b located at one end of the semicircular arm 23, 24 and a line connecting the end coupling shafts 14a, 14b located at the other end of the semicircular arm 23, 24 are a diameter line perpendicular to tangent lines to the semicircular arm 23, 24 at the starting and terminal ends of the semicircular shape and passing through the center of the circle. The linear arms 21, 22 and the semicircular arms 23, 24 can therefore be pivotally coupled via common end coupling shafts 14a, 14b.

FIG. 10 is an enlarged view of a portion A in FIG. 9 (a part of the second linear arm 22). As shown in the figure, the first and second rigid members 11, 12 are linear members. The projecting member 15 having an engaging protrusion is provided on one end of the first rigid member 11 of the first cross unit 10A, and the opposing projecting member 16 having an engaging recess is attached to the other end of the first rigid member 11 of the second cross unit 10B.

FIG. 11 is an enlarged view of a portion B in FIG. 9 (a joint portion between the first linear arm 21 and the first semicircular arm 23). As shown in the figure, first and second rigid members 11a, 12a forming the cross units of the semicircular arm 23 are curved in the lateral direction of the first and second rigid members 11a, 12a. The semicircular arm 23 therefore extends and collapses in a semicircular path. The projecting member 15 having an engaging protrusion and the opposing projecting member 16 having an engaging recess are also provided on the first and second rigid members 11a, 12a of the semicircular arm 23.

The variable shape frame 20 shown in FIGS. 9 to 11 has a track shape. However, in another embodiment, a frame may be comprised of three linear arms and one semicircular arm. Adjacent ones of the linear arms are pivotally coupled via, e.g., a bent corner member.

Figure 12:
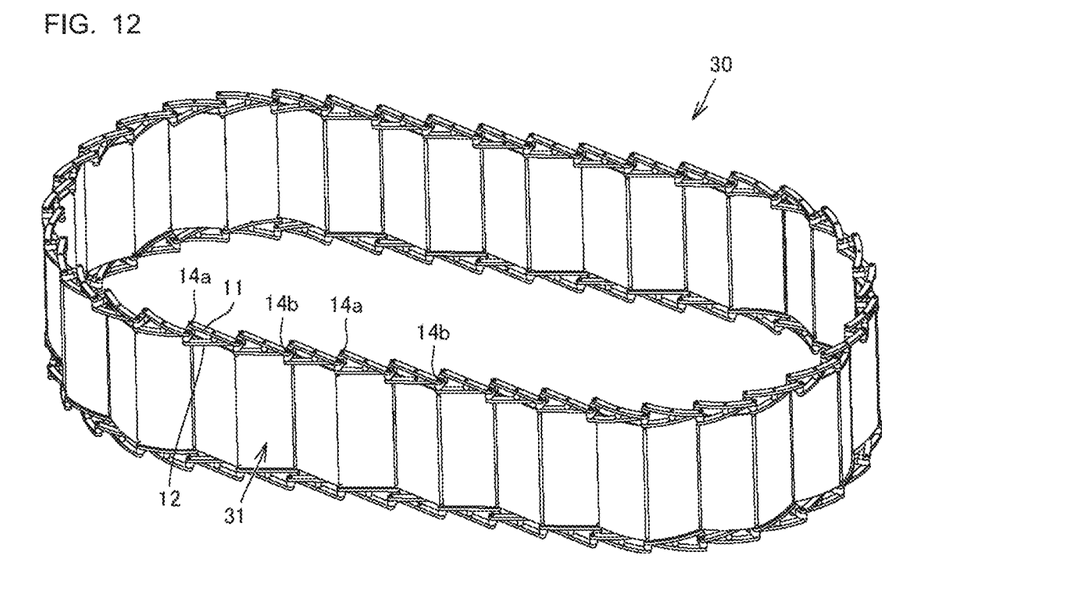
FIG. 12 is a perspective view of a variable shape three-dimensional structure according to an embodiment of the present invention.

Embodiment of FIG. 12

A variable shape three-dimensional structure according to the present invention includes two of the variable shape frames of the present invention which are arranged at an interval in the vertical direction and connected via longitudinal coupling members. A variable shape three-dimensional structure 30 shown in FIG. 12 includes two of the variable shape frames 20 of FIGS. 9 to 11 which are coupled via longitudinal coupling members. The longitudinal coupling member may be either a member coupling the upper and lower middle coupling shafts 13 or a member coupling the upper and lower end coupling shafts 14a, 14b.

The three-dimensional shape of the variable shape three-dimensional structure 30 becomes larger as the extendable arms extend, and becomes smaller as the extendable arms collapse. When the longitudinal coupling members have a fixed length, the three-dimensional shape always have a fixed height. However, the longitudinal coupling members may have a variable length so that the height of the three-dimensional shape can be varied as the extendable arms extend and collapse.

The variable shape three-dimensional structure 30 shown in FIG. 12 includes an enclosing member 31 that encloses the variable shape three-dimensional structure 30 along its outer or inner periphery without gaps. As shown in the figure, the enclosing member 31 includes a plurality of panels connected to the longitudinal coupling members coupling the upper and lower end coupling shafts 14a, 14b. Both circumferential edges of each panel are connected to the longitudinal coupling members adjacent to the panel. Specifically, one circumferential edge of each panel is connected to the longitudinal coupling member located on the inner side of the frame, and the other circumferential edge of each panel is connected to the longitudinal coupling member located on the outer side of the frame. The enclosing member 31 formed by connecting the panels together thus has a zigzag shape extending along the inner or outer periphery of the frame (variable-shape three-dimensional structure).

In the variable shape three-dimensional structure 30 shown in FIG. 12, the enclosing member 31 always separates the inner space from the outer space of the variable shape three-dimensional structure 30 regardless of whether the extendable arms are in the extended state or the collapsed state. Wind, dust, etc. are thus effectively prevented from entering the inner space.

Figure 13:
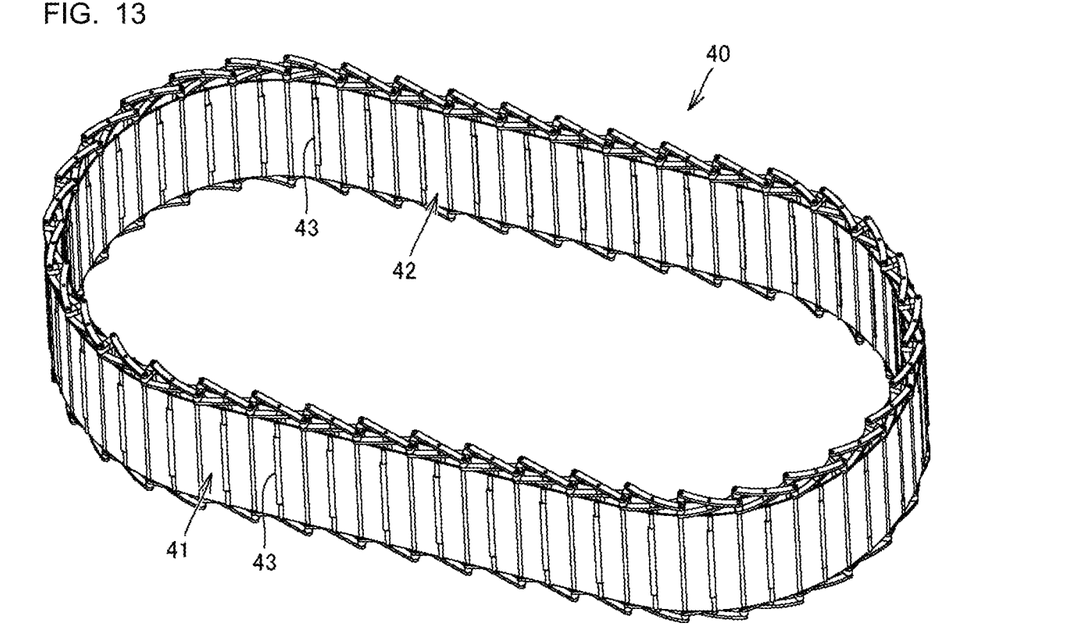
FIG. 13 is a perspective view of a variable shape three-dimensional structure according to another embodiment of the present invention in the extended state.
Figure 14:
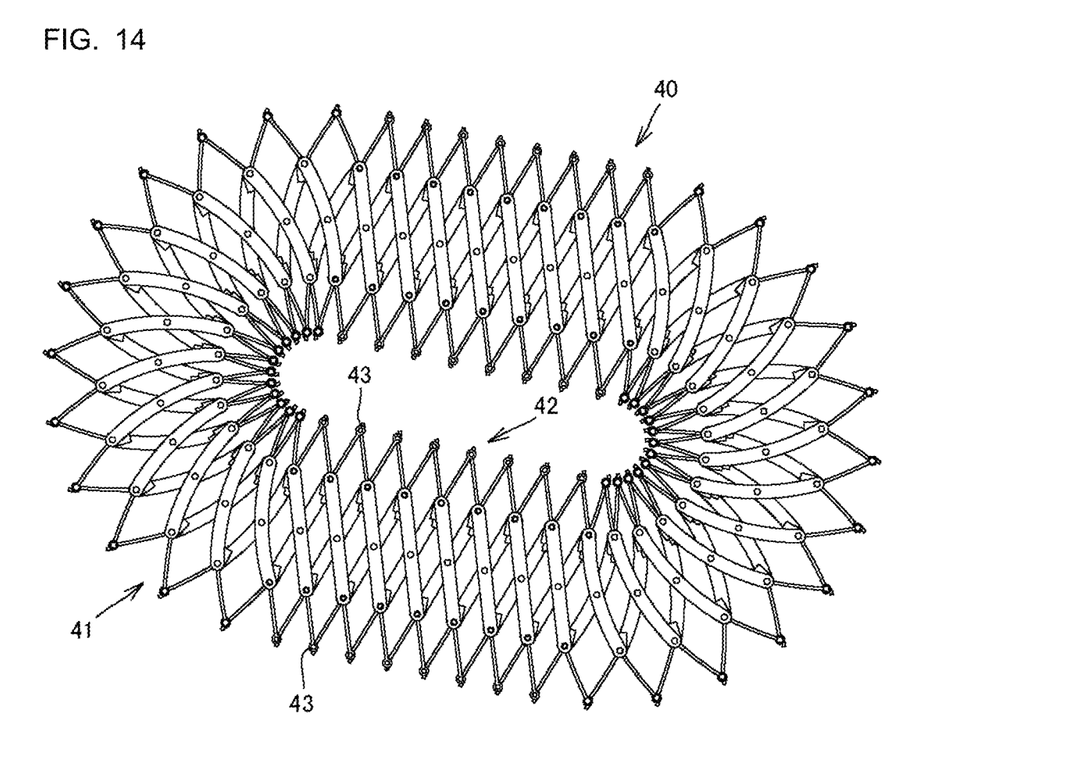
FIG. 14 is a front view of the variable shape three-dimensional structure of FIG. 13 in the collapsed state.

Embodiment of FIGS. 13 and 14

A variable shape three-dimensional structure 40 shown in FIGS. 13 and 14 has the same structure as the embodiment shown in FIG. 12 except for the enclosing member.

An enclosing member of the variable shape three-dimensional structure 40 shown in FIGS. 13 and 14 includes an outer enclosing member 41 and an inner enclosing member 42. The outer enclosing member 41 encloses the variable shape three-dimensional structure 40 along its outer periphery, and the inner enclosing member 42 encloses the variable shape three-dimensional structure 40 along its inner periphery. The outer enclosing member 41 is a member formed by connecting bent panels in the circumferential direction with middle bend shafts 43 projecting outward. The inner enclosing member 42 is a member formed by connecting bent panels in the circumferential direction with middle bend shafts 43 projecting inward. Both edges of each bent panel of the outer enclosing member 41 are connected to adjacent ones of the longitudinal coupling members located on the outer side of the frame. Both edges of each bent panel of the inner enclosing member 42 are connected to adjacent ones of the longitudinal coupling members located on the inner side of the frame.

As shown in FIG. 14, when the variable shape three-dimensional structure 40 is in the collapsed state, the outer enclosing member 41 and the inner enclosing member 42 have a zigzag shape in the circumferential direction. As shown in FIG. 13, when the variable shape three-dimensional structure 40 is in a predetermined extended state, the outer enclosing member 41 and the inner enclosing member 42 have generally smooth flat and curved surfaces.

As in the embodiment shown in FIG. 12, according to the variable shape three-dimensional structure 40 shown in FIGS. 13 and 14, the enclosing members 41, 42 always separate the inner space from the outer space of the variable shape three-dimensional structure 40 regardless of whether the extendable arms are in the extended state or the collapsed state.

Although some embodiments of the present invention are described above with reference to the drawings, the present invention is not limited to the illustrated embodiments. Various modifications or variations can be made to the illustrated embodiments without departing from the spirit and scope of the present invention.

The extendable arm, the variable shape frame, and the variable shape three-dimensional structure according to the present invention can be used in many applications such as partitions, containers, architectural structures, exhibits, pavilions, play equipment, assembling toys, decorations, art objects, furniture, beds of vehicles, enclosures for animals such as pets, robot bodies, water tanks, pools, bathroom stalls, dressing stalls, shower stalls, above-ground buildings, underground buildings, underwater buildings, aerial buildings, temporary houses, warehouses, vegetable factories, tents, zoos, and botanical gardens.

The invention claimed is:

1. An extendable arm, comprising:
   a plurality of cross units arranged in one direction with adjacent cross units of the plurality of cross units being pivotally coupled via end coupling shafts, each cross unit of the plurality of cross units comprising:
      a first rigid member having an engaging protrusion extending away from an outer surface of the first rigid member; and
      a second rigid member crossing the first rigid member in an X shape and pivotally coupled with the first rigid member via a middle coupling shaft, the second rigid member comprising an engaging recess configured to receive the engaging protrusion such that the engaging protrusion and the engaging recess, which move toward each other as the extendable arm extends, fit together when the extendable arm extends to a predetermined length,
   wherein the engaging recess extends into a body of the second rigid member.

2. The extendable arm according to claim 1, wherein
   the engaging protrusion extending away from the outer surface of the first rigid member of least one cross unit of the plurality of cross units is between an end of the first rigid member of the least one cross unit and a midpoint of the first rigid member of the least one cross unit, and
   the engaging recess extending into the body of the second rigid member of the least one cross unit is between an end of the second rigid member of the least one cross unit and a midpoint of the second rigid member of the least one cross unit.

3. A variable shape frame, comprising the extendable arm of claim 1, wherein the extendable arm is a first extendable arm, and the variable shape frame further comprises:
   a second extendable arm;
   a third extendable arm; and
   a fourth extendable arm,
wherein
   the first extendable arm is coupled with the third extendable arm and the fourth extendable arm,
   the second extendable arm is coupled with the third extendable arm and the fourth extendable arm, and
   a starting end of each of the first extendable arm, the second extendable arm, the third extendable arm, and the fourth extendable arm is pivotally coupled with a terminal end of an adjacent one of the first extendable arm, the second extendable arm, the third extendable arm, and the fourth extendable arm via one or more of the end coupling shafts.

4. The variable shape frame according to claim 3, wherein
   the first extendable arm and the second extendable arm are linear arms that are parallel to each other and extend and collapse in a linear fashion,
   the third extendable arm and the fourth extendable arm are semicircular arms that extend and collapse in a curved fashion,
   the third extendable arm and the fourth extendable arm have opposing 180-degree semicircular shapes when in an extended state, and
   the variable shape frame is an obround-shaped frame.

5. A variable shape three-dimensional structure, comprising the variable shape frame according to claim 3, wherein the variable shape frame is a first variable shape frame, and the variable shape three-dimensional structure further comprises:
- a second variable shape frame arranged at an interval in a vertical direction away from the first variable shape frame; and
- at least one a longitudinal coupling member connecting the first variable shape frame and the second variable shape frame.

6. The variable shape three-dimensional structure according to claim 5, wherein the at least one longitudinal coupling member comprises a plurality of longitudinal coupling members, and the variable shape three-dimensional structure further comprises:
- an enclosing member that weaves around adjacent longitudinal coupling members of the plurality of longitudinal coupling members,
- wherein the enclosing member is on an outside of alternating longitudinal coupling members of the plurality of longitudinal coupling members and on an inside of longitudinal coupling members of the plurality of longitudinal coupling members between the alternating longitudinal coupling members such that the enclosing member closes the interval in the vertical direction between the first variable shape frame and the second variable shape frame so as to enclose at least one of an outer or an inner periphery of the variable shape three-dimensional structure in a direction transverse to the vertical direction.

7. The variable shape three-dimensional structure according to claim 5, wherein the at least one longitudinal coupling member comprises a plurality of longitudinal coupling members, and the variable shape three-dimensional structure further comprises:
- an enclosing member comprising a plurality of panels, each panel of the plurality of panels is coupled with one of the vertical coupling shafts, and each panel of the plurality of panels is coupled with an adjacent panel of the plurality of panels by a middle bend shaft, wherein
- the enclosing member is caused to project outwardly away from the plurality of longitudinal coupling members such that the enclosing member is in a zig-zag shape when the variable shape three-dimensional structure is in a collapsed state, and
- the enclosing member closes the interval in the vertical direction between the first variable shape frame and the second variable shape frame so as to enclose an outer periphery of the variable shape three-dimensional structure in a direction transverse to the vertical direction.

8. The variable shape three-dimensional structure according to claim 7, wherein the enclosing member is a first enclosing member comprising a plurality of first panels, and the variable shape three-dimensional structure further comprises:
- a second enclosing member comprising a plurality of second panels, each second panel of the plurality of second panels is coupled with one of the vertical coupling shafts, and each second panel of the plurality of second panels is coupled with an adjacent second panel of the plurality of second panels by an inner middle bend shaft, wherein
- the second enclosing member is caused to project inwardly into a space between the plurality of longitudinal coupling members such that the second enclosing member is in a zig-zag shape when the variable shape three-dimensional structure is in the collapsed state, and
- the second enclosing member closes the interval in the vertical direction between the first variable shape frame and the second variable shape frame so as to enclose an inner periphery of the variable shape three-dimensional structure in the direction transverse to the vertical direction.

9. The variable shape three-dimensional structure according to claim 5, wherein the at least one longitudinal coupling member comprises a plurality of longitudinal coupling members, and the variable shape three-dimensional structure further comprises:
- an enclosing member comprising a plurality of panels, each panel of the plurality of panels is coupled with one of the vertical coupling shafts, and each panel of the plurality of panels is coupled with an adjacent panel of the plurality of panels by a middle bend shaft, wherein
- the enclosing member is caused to project inwardly into a space between the plurality of longitudinal coupling members such that the enclosing member is in a zig-zag shape when the variable shape three-dimensional structure is in a collapsed state, and
- the enclosing member closes the interval in the vertical direction between the first variable shape frame and the second variable shape frame so as to enclose an inner periphery of the variable shape three-dimensional structure in a direction transverse to the vertical direction.

10. A variable shape frame, comprising the extendable arm of claim 1, wherein a starting end of the extendable arm is pivotally coupled with a terminal end of the extendable arm opposite the starting end of the extendable arm via one or more of the end coupling shafts.

* * * * *